US012160486B2

(12) United States Patent
Sprague et al.

(10) Patent No.: US 12,160,486 B2
(45) Date of Patent: Dec. 3, 2024

(54) ANONYMOUS ECOMMERCE BEHAVIOR TRACKING

(71) Applicant: Popdust, Inc., Wilmington, DE (US)

(72) Inventors: Michael Sprague, New York, NY (US); Sameet U. Durg, New York, NY (US); William Fielding Frank, Auburn, NH (US); George Mario Fortuna, Cold Spring, NY (US)

(73) Assignee: Popdust, Inc., Wilmington, DE (US)

( * ) Notice: Subject to any disclaimer, the term of this patent is extended or adjusted under 35 U.S.C. 154(b) by 0 days.

(21) Appl. No.: 18/310,719

(22) Filed: May 2, 2023

(65) Prior Publication Data

US 2024/0007543 A1    Jan. 4, 2024

Related U.S. Application Data

(63) Continuation of application No. 16/455,362, filed on Jun. 27, 2019, now Pat. No. 11,671,509.

(Continued)

(51) Int. Cl.
*H04L 67/50* (2022.01)
*H04L 9/06* (2006.01)
(Continued)

(52) U.S. Cl.
CPC .......... *H04L 67/535* (2022.05); *H04L 9/0643* (2013.01); *H04L 9/0877* (2013.01); *H04L 9/0897* (2013.01); *H04L 9/50* (2022.05)

(58) Field of Classification Search
CPC .. H04L 67/535; H04L 9/0643; H04L 63/0421
See application file for complete search history.

(56) References Cited

U.S. PATENT DOCUMENTS 6,601,233 B1 * 7/2003 Underwood .............. G06F 8/24
717/102
6,633,878 B1 * 10/2003 Underwood ........... G06Q 10/10
707/999.102

(Continued)

OTHER PUBLICATIONS

Non-Final Office Action for U.S. Appl. No. 16/455,362, titled "Computer Method and System of Identifying Genomic Mutations Using Graph-Based Local Assembly," Date Mailed: Jun. 2, 2022.

(Continued)

*Primary Examiner* — Jimmy H Tran
(74) *Attorney, Agent, or Firm* — Hamilton, Brook, Smith & Reynolds, P.C.

(57) ABSTRACT

A system and corresponding method gather information about browsing and purchasing behavior of web users to avoid tracking information associated with individual web browser instances. The system enables collection of historical and statistical information by legitimate interested parties to be severed from information about the behavior of a browser instance, and so too from information about the user of the browser instance. The system is configured to perform at least one of: (i) masking a web browser cookie to prevent use of the cookie to access browsing information related to a user and (ii) replace stories about sequences of browser behaviors with statistics about abstracted "story types." A story type is a sequence of behavior types common to all web browser instances which have performed that sequence. An example embodiment uses masking and aggregation techniques, frequently, and includes a variety of industry standard security measures specially adapted to these purposes.

20 Claims, 3 Drawing Sheets

Related U.S. Application Data

(60) Provisional application No. 62/699,435, filed on Jul. 17, 2018.

(51) Int. Cl.
*H04L 9/08* (2006.01)
*H04L 9/00* (2022.01)

(56) References Cited

U.S. PATENT DOCUMENTS

| | | | | |
|---|---|---|---|---|
| 6,704,873 | B1* | 3/2004 | Underwood | H04L 67/10 709/249 |
| 6,718,535 | B1* | 4/2004 | Underwood | G06F 9/451 717/101 |
| 7,100,195 | B1* | 8/2006 | Underwood | H04L 63/0823 707/999.009 |
| 7,779,103 | B1* | 8/2010 | Fikes | G06F 21/6263 709/227 |
| 8,719,572 | B2* | 5/2014 | Schertzinger | G06F 21/33 713/170 |
| 9,553,918 | B1* | 1/2017 | Manion | G06F 16/40 |
| 10,621,600 | B2* | 4/2020 | Palan | G06Q 30/0202 |
| 11,039,178 | B2* | 6/2021 | Neumeier | G06Q 30/0277 |
| 11,157,944 | B2* | 10/2021 | Roullier | G06Q 30/0251 |
| 11,671,509 | B2 | 6/2023 | Sprague et al. | |
| 2005/0288954 | A1* | 12/2005 | McCarthy | G06Q 30/02 705/2 |
| 2006/0293921 | A1* | 12/2006 | McCarthy | A61B 5/6815 705/2 |
| 2007/0067297 | A1* | 3/2007 | Kublickis | G06Q 30/02 707/999.009 |
| 2008/0222270 | A1* | 9/2008 | Gilbert | H04L 67/02 709/217 |
| 2009/0171982 | A1* | 7/2009 | Hagan | G06F 21/6254 |
| 2010/0017596 | A1* | 1/2010 | Schertzinger | H04L 63/062 713/155 |
| 2010/0281008 | A1* | 11/2010 | Braunwarth | G06F 16/955 709/224 |
| 2010/0313009 | A1* | 12/2010 | Combet | H04L 63/0421 709/224 |
| 2011/0161422 | A1* | 6/2011 | Bender | G06Q 20/383 709/204 |
| 2011/0191664 | A1* | 8/2011 | Sheleheda | G06F 21/552 709/224 |
| 2011/0208850 | A1* | 8/2011 | Sheleheda | G06F 16/9535 709/223 |
| 2012/0084348 | A1* | 4/2012 | Lee | G06Q 30/0261 709/203 |
| 2012/0210119 | A1* | 8/2012 | Baxter | G06Q 30/0253 713/150 |
| 2012/0270567 | A1* | 10/2012 | Johnson | G06Q 30/02 455/456.3 |
| 2012/0290708 | A1* | 11/2012 | Siemsgluess | G06Q 30/02 709/224 |
| 2013/0080498 | A1* | 3/2013 | Desilva | H04L 67/56 709/201 |
| 2013/0097664 | A1* | 4/2013 | Herz | G06Q 30/02 726/1 |
| 2014/0059647 | A1* | 2/2014 | Immonen | H04L 63/102 726/28 |
| 2014/0287723 | A1* | 9/2014 | LaFever | G06Q 30/0255 455/411 |
| 2015/0081423 | A1* | 3/2015 | Palan | G06Q 30/0246 705/14.45 |
| 2015/0081562 | A1* | 3/2015 | Roullier | H04L 9/0894 705/50 |
| 2015/0088612 | A1* | 3/2015 | Palan | G06Q 30/0205 705/7.29 |
| 2016/0330237 | A1* | 11/2016 | Edlabadkar | H04L 63/1475 |
| 2016/0364736 | A1* | 12/2016 | Maugans, III | H04L 67/535 |
| 2017/0093996 | A1* | 3/2017 | Amalapurapu | G06F 16/95 |
| 2017/0236168 | A1* | 8/2017 | Roullier | G06F 21/6245 705/14.73 |
| 2019/0208026 | A1* | 7/2019 | Chen | G06F 16/954 |
| 2019/0386969 | A1* | 12/2019 | Verzun | G06F 21/606 |
| 2020/0028926 | A1 | 1/2020 | Sprague et al. | |
| 2020/0410514 | A1* | 12/2020 | Livhits | G06Q 30/0269 |
| 2021/0097546 | A1* | 4/2021 | Adjaoute | G06Q 30/0201 |
| 2021/0192066 | A1* | 6/2021 | Naqvi | H04L 9/3231 |
| 2022/0050921 | A1* | 2/2022 | LaFever | H04L 63/20 |
| 2022/0101376 | A1* | 3/2022 | Linietsky | G06Q 30/0255 |
| 2022/0122097 | A1* | 4/2022 | Maugans, III | G06F 16/9566 |
| 2022/0188699 | A1* | 6/2022 | Matlick | G06F 21/6254 |
| 2022/0369106 | A1* | 11/2022 | Turgeman | H04W 12/06 |
| 2023/0232052 | A1* | 7/2023 | Khavronin | H04N 21/251 709/219 |
| 2024/0013225 | A1* | 1/2024 | Novick | H04W 12/122 |

OTHER PUBLICATIONS

Robson, "Cookie Attacks Protection with Encrypted Cookies in Browser," presented in a treehouse learning blog, 2017.
Notice of Allowance for U.S. Appl. No. 16/455,362, Date Mailed: Jan. 31, 2023.

* cited by examiner

ANONYMOUS ECOMMERCE BEHAVIOR TRACKING

RELATED APPLICATIONS

This application is a continuation of U.S. application Ser. No. 16/455,362, filed on Jun. 27, 2019, now U.S. Pat. No. 11,671,509, granted on Jun. 6, 2023, which claims the benefit of U.S. Provisional Application No. 62/699,435, filed on Jul. 17, 2018. The entire teachings of the above applications are incorporated herein by reference.

BACKGROUND

The web browsing and purchasing behavior of web users is essential knowledge for e-Commerce marketing. Marketers often gather information about the identity or identifying attributes of users, but this information is not necessary for their purposes. Cookies have long been the primary means of gathering this information for all marketing participants, except for browser software vendors, who have more direct access into the behavior of browser uses. Cookies placed in browser instances, used in conjunction with pixels placed in the web pages served by websites, enable the behaviors of a browser instance to be associated with previous and future behaviors of the same browser instance, identifying the instance by the unique cookie placed there. Some participants use cookies and pixels in ways that can be misused to reveal personal information about the browser instance user. Some such participants may be collecting such information.

Some interpretations of privacy requirements, such as some interpretations of the General Data Protection Regulation emerging from the European Union, assert that the use of cookies violates privacy laws. In the future, there may be other such new regulations and views, which may be applied in other jurisdictions.

SUMMARY

An example embodiment ensures the identity of a cookie associated with an instance of a user's web browser is either a) masked to produce an anonymous token, or b) entirely eliminated in favor of aggregate behavioral equivalence classes, enabling collection of historical and statistical information about the browser classes. The example embodiment enables legitimate interested parties to keep information relevant to marketing and sales trends, while isolating those parties from knowledge of the browser instance, by instead only providing information about the web browsing behavior effected through the instance. The example embodiment transforms the cookie into an anonymous same-or-different identifying token, called a continuity token, or track only aggregates, not individual events at all, or else does both of these functions. The example embodiment preserves the cookie's use in gathering information about eCommerce behavior minus the cookie, and minus any way to identify a browser instance. Of course, the cookie itself is often an anonymous identifier of the browser instance, so the example embodiment provides a second tier of anonymity to the use of the cookie in tracking web browser interactions, and an example embodiment may eliminate all but group behaviors from the e-commerce participants history tracking. In these ways, the historical and statistical information cannot be later re-associated with a particular browser instance.

An example embodiment may be directed to computer systems, methods, and program products for anonymous and aggregated browser event tracking. The systems, methods, and program products prevent the need to use a cookie (associated with a web browser instance) for accessing web browsing information related to a user of the web browser instance. These systems, methods, and program products can be applied together, separately, or in any combination.

In these example embodiments, a user may access a website through an instance of a web browser executing on a computing device. The website may place a cookie in the browser instance, and then log the browser's current and future behavior using the cookie and a trigger on the website embodied in a pixel. These embodiments separate the cookie, which is tied to the browser, from the tracking of the browser's behaviors. These embodiments may do so in such a way that no behaviors of individual browsers, even separated from their cookies, are tracked.

In the first class of embodiments, the cookie is transformed into a continuity token that lets the website know only that the same browser instance as encountered before is exhibiting a behavior, or that the behavior is exhibited by a new, previously unencountered, browser instance.

In the first example embodiment in this class, to prevent use of the cookie to access web browsing information related to the user, the systems, methods, and program products encrypt the cookie into a continuity token at the web server using an encryption key. The systems, methods, and program products store the continuity token and the encryption key only at the web server, and store the generated cookie only at the computing device. Each time the cookie is delivered to the web server with an associated web browser event, the systems, methods, and program products: (i) encrypt the delivered cookie using the encryption key and (ii) validate the encrypted delivered cookie against the stored encrypted cookie prior to recording the web browser event.

In a second example embodiment in this class, the cookie is hashed using a one-way hash, producing a continuity token such that the cookie cannot be recovered after hashing. Yet when the same cookie is encountered again, and hashing is performed, the resulting continuity tokens can be compared to determine if the behavior was evinced by the same or a different browser instance. In a preferred embodiment of this second example kind, there is a hashing seed for each cookie that is the value of the cookie itself, so the seed need not be stored. The seed will be different for every cookie, but can only be discovered by someone who already knew the cookie value.

In a third embodiment in this first class, to prevent use of the cookie to access web browsing information related to the user, the systems, methods, and program products place, by an agent of the web server, an application associated with the web browser instance on the computing device. The application may be a universal pixel configured with a process that generates the anonymous identifier. The systems, methods, and program products cause a browser event related to the web browser instance. In response to the browser event, the placed application associated with the instance generates an anonymous identifier for the web browser instance, and then transmits the generated anonymous identifier to the web browser instance. The systems, methods, and program products report the browser event to the web server, including the generated anonymous identifier in a structure that disguises the role of the generated unique identifier. The systems, methods, and program products use the anonymous identifier, in place of the cookie, to record the browser event at the web server.

In a fourth example embodiment in this first class (cookie obscuring class), to prevent use of the cookie to access web browsing information related to the user, the systems, methods, and program products configure a private continuity token ledger in memory or storage communicatively coupled to a server. This private ledger stores the sequence of each browser event associated with continuity token, called a "story." In an example embodiment, the private ledger replaces stories (continuity token) about sequences of browser behaviors with statistics about abstracted "story types." A story type being a sequence of behavior types common to all web browser instances which have performed that sequence. The systems, methods, and program products collect a browser event experienced by the web browser instance on the computing device. At the web server, the systems, methods, and program products identify the private ledger associated with the token. The systems, methods, and program products add the collected browser event to the identified story stored in the appropriate ledger. The systems, methods, and program products may protect access to the private story ledger with identification and authorization rights, including the use of blockchain technology.

The example embodiment that replaces stories with story types may assign behavior aggregation identifies (BAIs) to each behavior and sequence of behaviors observed, independently from the browser instance that exhibited the behavior. It may associate statistics such as numbers and times and network contexts of occurrence with the BAIs. The information about the individual browser instance behavior is not collected by the pixel, or if collected, not retained. The information necessary to measure web marketing performance is derived instead from the pre-aggregated BAIs.

In a second class of embodiments, to prevent reference to any individual web browser behaviors whatsoever, the systems, methods, and program products configure at a web server, a behavior aggregation identifier that maintains aggregated statistics related to a *set* of browser behaviors. The aggregation identifier has a sequence of one or more event types associated with it and represents all the browsers which have exhibited this sequence of event types. At least one behavior aggregation identifier (BAI) applies to each browser instance. The server need not know any individual identity for the instance, only the BAI (or BAIs) to which it belongs. When any browser instance with a given BAI-1 exhibits a new behavior, a new BAI-2 is assigned that is the sequence of the BAI-1 behaviors followed by the new behavior. If there already exists this sequence with a BAI-2 assigned to it, then the browser instance is now assigned to this new group. If such a sequence does not yet exist, then it is created, and the browser instance is assigned to that group. In this way, browser instances are not assigned unique continuity tokens, but instead their behaviors are captured in a token shared by all browser instances which have exhibited the same sequence of behaviors. Thus, the BAI is a continuity token not for a browser instance, but for an equivalence class of instances.

Different embodiments in this class may:
i. assign the BAI to the browser instance using different mechanisms, for example, a. inserting the generic BAI as a 'pseudo cookie' into the browser instance, so that unique cookies are not in the instances being tracked. For another example, b. using an embodiment of the first class to capture anonymous continuity tokens for each browser instance, and associating these captured tokens with the BAIs to which they belong. Embodiments of this type i are preferred.

ii. create separate aggregations based on different rules of 'same' and 'different' for the aggregations, rather than for the browsers. For example, one aggregator system might treat any two clicks to a landing page as the same event, while another might distinguish between which clickable item in the content was clicked. Finer grained embodiments are preferred.

iii. count aggregate amounts differently. For example, in one embodiment, a browser event that has contributed to a count for the BAI-1 may be removed from that count when the BAI signals that a new event has occurred, creating BAI-2, while another embodiment may count the browser event twice, as part of both BAIs, and a third embodiment might have two counts—both unique counts and multiple counts. This is similar to noting that every winner of the Triple Crown is also a winner of the Kentucky Derby, and can be counted in the number of winners of each. BAIs with unique counts are based on a story type partitioning, while BAIs that allow multiple counts ensure only that the story types are exhaustive—every browser's story is attached to at least one story type.

Embodiments in which only unique or only multiple counts are consistently tracked are preferred, since the alternative counts may be calculated from one set or the other. Counting each event only once is preferred, since the multiple counts can be computed most directly from these unique counts, as needed. For example, if we know how many have won only one of the three races, which two of the three races, and how many have won the Triple Crown, we can find out the total winners of the Derby by adding the appropriate unique numbers together. The systems, methods, and program products collect a browser event experienced by the web browser instance on the computing device, the collected browser event being aggregated as an addition to the number of browser events that have followed the same event sequence. The systems, methods, and program products report the collected browser event aggregation. At the web server, the systems, methods, and program products determine the aggregation identifier linked to the reported cookie and update the aggregated statistics of the linked aggregation identifier according to the collected browser event.

In a third type of embodiment, both a cookie obscuring embodiment and a behavior aggregation embodiment are used together. In these embodiments, when receiving a web browser event at the web server, the systems, methods, and program products may decide whether: (i) the linked aggregation identifier continues to apply to the reported continuity identifier, (ii) a different aggregation identifier instead applies to the continuity identifier, or (iii) a new aggregation identifier needs to be created and linked to the continuity identifier. Based on the decision, the systems, methods, and program products adjust the current linking between the reported cookie and aggregation identifier.

Whenever the first cookie obscuring, continuity token class of embodiments is used, either alone or in conjunction with the second behavior aggregation class of embodiments, different realization of the system and software may use different techniques and hardware for securing one or more of: the values of the continuity token and the association between the continuity token and the behavior aggregation identifier. The continuity tokens and the links between the aggregation identifier and each token may be stored in a secure memory storage space coupled to the web server, using asymmetric keypairs. The secure memory storage space may be protected by at least one of: managed by a secure capsule on the server, which may be either a Trusted Platform Module (TPM), asymmetric keypairs managed by a Trusted Execution Environment (TEE), or may be blockchain keypairs. The systems, methods, and program products generate a cookie at the web server, the generated cookie being used to identify browser event records stored at the server. The systems, methods, and program products invoke the secure capsule to securely encrypt the cookie using the private key. The systems, methods, and program products place the encrypted cookie at an instance of the web browser on a computing device. The systems, methods, and program products collect and report an event of the web browser to the web server, including the encrypted cookie associated with the web browser. The systems, methods, and program products decrypt the cookie by the computing node using the public key, and add the collected web browser event to the server event record without identifying the cookie.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.
Digital Processing Environment

Figure 1A:
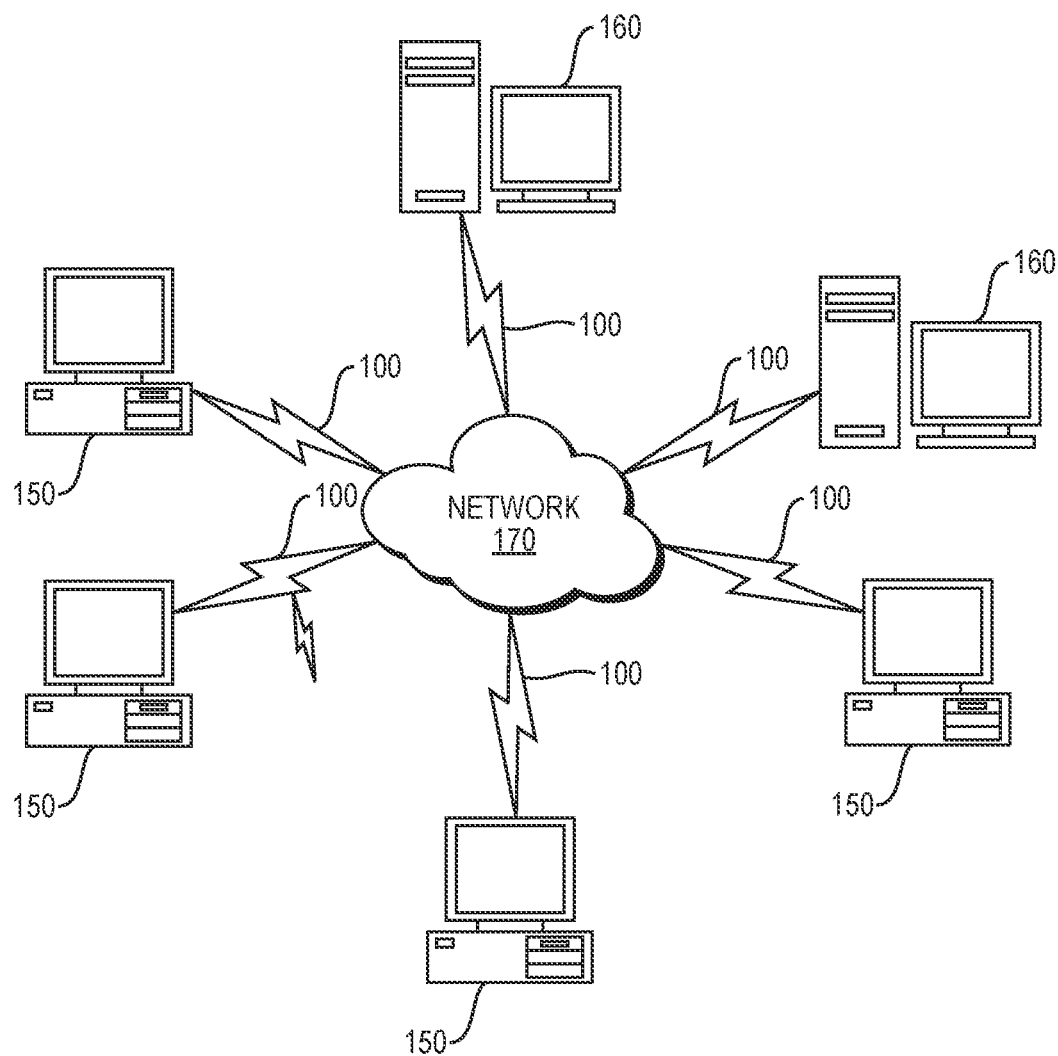
FIG. 1A is a diagram illustrating a computer network or similar digital processing environment in which an example embodiment may be implemented.

An example implementation of an anonymous browser tracking system 100 according to an example embodiment implemented in a software, firmware, or hardware environment. FIG. 1A illustrates one such example digital processing environment in which an example embodiment disclosed herein may be implemented. Client computers/devices 150 and server computers/devices 160 (or a cloud network 170) provide processing, storage, and input/output devices executing application programs and the like. Client computers/devices 150 may be linked directly or through communications network 170 to other computing devices, including other client computers/devices 150 and server computer/devices 160.

The communication network 170 can be part of a wireless or wired network, remote access network, a global network (i.e. Internet), a worldwide collection of computers, local area or wide area networks, and gateways, routers, and switches that currently use a variety of protocols (e.g., TCP/IP, Bluetooth®, RTM, etc.) to communicate with one another. The communication network 170 may also be a virtual private network (VPN) or an out-of-band managed network or both. The communication network 170 may take a variety of forms, including, but not limited to, a data network, voice network (e.g., land-line, mobile, etc.), audio network, video network, satellite network, radio network, and pager network. Other electronic device/computer networks architectures are also suitable.

Server computers 160 may be configured to provide system 100. The server computers need not be separate server computers but may instead be part of cloud network 170. The server computers 160 may include a web server configured in the computer environment of an online service provider. The web server presents a website through an instance of a web browser executing on a user computing device. The web server is configured to perform at least one of: masking a cookie associated with the web browser instance and collects statistical information about the browser instance as part of an equivalence class of instances, to prevent use of the cookie for accessing web browsing information related to a user of the web browser instance. To do so, the web server may encrypt the cookie and store the encrypted cookie only at the web server, while storing the original unencrypted cookie for use at the web browser instance. The web server may also include a secure capsule that uses a public-private keypair to encrypt the cookie, which is then placed encrypted for use at a web browser instance. The web server may instead include an agent that places an application (e.g., universal pixel) on the computing device to generate anonymous identifiers for use in place of the cookie. The web server may also or instead create behavior aggregation identifiers (BIAs) that each maintain aggregated statistics related to a set of browser instances (with the links between the aggregation identifiers and instances stored either in a secure memory space or in place of a cookie on the browser instance itself). The web server may further use a private cookie ledger to store web browser events associated with a cookie.

Client computers/devices 150 may include the user's computing device configured with a web browser for accessing websites, such as the website of the online service provider. The user computing device may store cookies or other identifiers (e.g., anonymous identifiers or BIAs) associated with the web browser instances of accessed websites. An instance of the web browser at the computing device may report web browser events associated with a cookie (or other identifier) to a web server, ordinarily via the firing of a pixel.

Figure 1B:
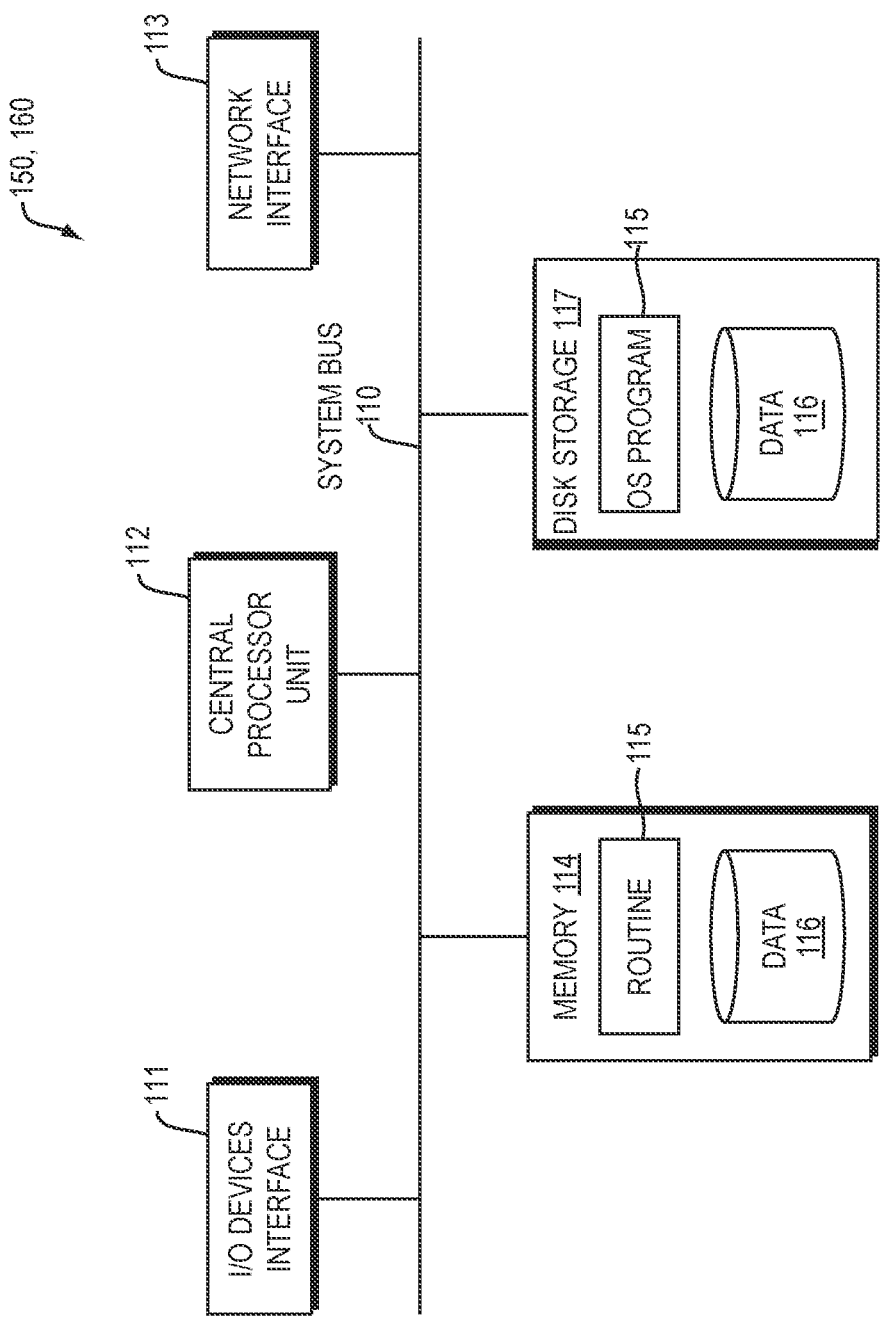
FIG. 1B is a block diagram of certain components of the computer nodes in the network of FIG. 1A.

FIG. 1B is a block diagram of any internal structure of a computer/computing node (e.g., client processor/device 150 or server computers 160) in the processing environment of FIG. 1A, which may be used to facilitate displaying audio, image, video or data signal information. Each computer 150, 160 in FIG. 1B contains a system bus 110, where a bus is a set of actual or virtual hardware lines used for data transfer among the components of a computer or processing system. The system bus 110 is essentially a shared conduit that connects different elements of a computer system (e.g., processor, disk storage, memory, input/output ports, etc.) that enables the transfer of data between elements.

Attached to the system bus 110 is an I/O device interface 111 for connecting various input and output devices (e.g., keyboard, mouse, touch screen interface, displays, printers, speakers, audio inputs and outputs, video inputs and outputs, microphone jacks, etc.) to the computer 150, 160. A network interface 113 allows the computer to connect to various other devices attached to a network (for example the network illustrated at 170 of FIG. 1A). Memory 114 provides volatile storage for computer software instructions 115 and data 116 used to implement software implementations of some embodiments of the present disclosure. Such components 115, 116 of the system 100 described herein may be configured using any programming language, including any high-level, object-oriented programming language, such as Python. The components may include a component configured on a server computer 160 that generates an anonymous browser tracking token.

In an example mobile implementation, a mobile agent implementation may be provided. A client server environment can be used to enable mobile security services using the server 190. It can use, for example, the XMPP protocol to tether a device authentication engine/agent 115 on the device 150 to a server 160. The server 160 can then issue commands to the mobile phone on request. The mobile user interface framework to access certain components of the system 100 may be based on XHP, Javelin and WURFL. In another example mobile implementation for OS X and iOS operating systems and their respective APIs, Cocoa and Cocoa Touch may be used to implement the client-side components 115 using Objective-C or any other high-level programming language that adds Smalltalk-style messaging to the C programming language. or Playgrounds and Swift or other languages and IDEs that use protocol-style messaging. The system may also include instances of server processes on the server computers 160.

Disk storage 117 provides non-volatile storage for computer software instructions 115 (equivalently "OS program") and data 116 used to implement embodiments of the system 100. The system may include disk storage accessible to the server computer 160. The server computer can maintain secure access to records related to the users registered performing online transactions with the online service provider through the server computer. Central processor unit (CPU) 112 is also attached to the system bus 110 and provides for the execution of computer instructions.

In an example embodiment, the processor routines 115 and data 116 are computer program products. For example, aspects of the system 100 may include both server side and client-side components.

Software implementations 115, 116 may be implemented as a computer readable medium capable of being stored on a storage device 117, which provides at least a portion of the software instructions for the system 100. Executing instances of respective software components of the system 100, may be implemented as computer program products 115, and can be installed by any suitable software installation procedure, as is well known in the art. In another embodiment, at least a portion of the system software instructions 115 may be downloaded over a cable, communication and/or wireless connection via, for example, a browser SSL session or through an app (whether executed from a mobile or other computing device). In other embodiments, the system 100 software components 115, may be implemented as a computer program propagated signal product embodied on a propagated signal on a propagation medium (e.g., a radio wave, an infrared wave, a laser wave, a sound wave, or an electrical wave propagated over a global network such as the Internet, or other networks. Such carrier medium or signal provides at least a portion of the software instructions for the present system.

Privacy Requirements

Cookies have long been regarded as a means of gathering information about the web browsing behavior of a user, without gathering any information about the identity or any identifying attributes of the user. Some interpretations of increasingly extreme privacy requirements, such as the General Data Protection Regulation emerging from the European Union, assert that the use of cookies violates privacy laws. In the future, there may be other such views applied in jurisdictions. An example embodiment masks or eliminates cookies to ensure compliance with such privacy requirements.

Cookies and Browsers

An instance of a browser (i.e., browser instance) is the browser software as it is running on a given software environment, such as a virtual machine, usually on a given personal device such as a phone or computer. A "token" as referenced herein is an arbitrary sign that is held to indicate an association with an event, right, or responsibility. A cookie is a token represented by an arbitrary string of symbols that is placed inside (associated with) an instance of a browser. Cookies do not identify a user; cookies identify only the browser instance. A cookie can indicate that a certain action has been performed by the browser, such as a browser visiting a given website (ordinarily because a user asks the instance to do so). A cookie's purpose, for the manager of a website, is to know when the same browser instance returns again to the given website, or performs some other action related to the website.

For example, a user, David, uses the Google Chrome browser on his personal computer installed with Windows 10 to look at shoes at Zappos. The Zappos website generates a cookie for his instance of the Chrome browser on his personal computer. When he goes back to the Zappos website again to buy shoes, the website could view the cookie and present a "welcome back" greeting. If he registers his name at Zappos, then the next time he goes to the Zappos website, the website (web server of Zappos), but not the cookie, unless the cookie is injected with personal information, knows that the name associated with this cookie is 'David', and the website can present a "welcome back, David" greeting.

In this example, David also has another web browser instance on his computer, an instance of the Firefox browser. If he uses his Firefox browser to go to the Zappos website, Zappos will not find the cookie, because the cookie is present in the instance of the Chrome web browser, not the instance of the Firefox web browser. People can choose to coordinate their browser instances of the same browser software across devices, so that the Chrome instance on David's Samsung Galaxy Android phone and the Chrome instance on his Windows computer each hold a cookie that has been linked to the other cookie.

Cookie and Browser Privacy

An anonymous identification is a way of recognizing that an object is the same object that was encountered in some previous event without knowing anything else about that object or event, and especially without knowing how to relate the object to other aspects of the event occurrence or object.

For example, when a person takes a number at the deli counter, the person is given a paper token. When the person's number is called, and the person hands in the paper token, the counter attendant knows that the person is the same person who earlier took that paper token, but does not know anything else about the person. Of course, the person handing in the paper token is not necessarily the same person who took the number, since the person who took the number could have handed the paper token off to someone else, but the holder of that number is the holder of the paper token that identifies the earlier encounter with the number dispenser. With the deli counter paper token in hand, though, the counter attendant cannot tell how much the person weighs, where the person lives, and such.

An anonymous identifier is an identifier that itself does not provide any information about the object with which the identifier is attached. All anonymous identifications must use anonymous identifiers, such as the numbers at a deli counter. However, anonymous identifiers may be associated with other information about an object, such as an anonymous employee id that is made part of an employee record containing other employee information, such as the employee's name.

Sometimes, indistinguishable tokens can be held by a plurality, when the same event has occurred to all of the plurality. For example, when multiple people get ultraviolet stamps on their wrist that proves that they each have already entered a club.

A named identification, on the other hand, is an identification of an event that helps both to locate the event and the object presented in the event and to relate the event to other aspects of the event occurrence and object. For example, having a person's employee id, and access to employee records, much other information may be learned about the person.

In this way, cookies are ordinarily used to anonymously identify web browsers. The presence of a cookie associated with a web browser instance informs a website that the web browser instance is the same web browser instance that the website has before encountered. The website can then call up the history of that web browser using the cookie. Such a use of cookies is a form of anonymous identification. So, if a user allows such a cookie to be associated with one of the user's web browsers, the user is not giving away the user's identity. Rather, the user is making the user's web browser anonymously known to a web site that the user may want to interact with again, in a way that is tailored to the user's interests. In other words, the website knows that the current web browser is the same web browser that the website interacted with before, but does not know anything else about the web browser or the user of the web browser.

In general, personally identifying information (PPI) is information applied to a person, and may be combined with other such information, to uniquely identify the person. PPI and definitions of PPI are the key components in privacy laws. Personal information is any information that directly describes a person and is attached in some way to the person or a data representation of the person, so that the person might be locatable or identifiable using the PPI. The exact definition of PPI, and similar terms, differs from law to law. But in most cases, the general definition above covers the idea expressed in the various laws. In these cases, the presence of a cookie on a web browser is not itself PPI, because the cookie does not, nor is it useful in combination with other data, to identify an individual person. The presence of a cookie cannot even be used to locate the web browser instance on which the cookie resides. As the cookie is an anonymous identifier for the web browser, the cookie can only indicate to a system/server or web site that the web browser is the same web browser encountered in some previous circumstance, not an identify of the specific web browser. But since the cookie is treated as an arbitrary token by the browser, it is possible for an unconscientiously designed system to inject personally identifying information into a cookie.

Vague Privacy Rules and their Broad Interpretations

The newly-in-force European Union General Data Protection Regulations (GDPR) have a much vaguer definition of personal information or data. Under this regulation, "personal data" is any information "relating" to an identified or identifiable natural person, whether it relates to his or her private, professional or public life. The information can be anything from a name, a home address, a photo, an email address, bank details, posts on social networking websites, medical information, or a computer's IP address. All these examples, however, describe something about the person or the person's property. If we assign the person or property an anonymous identifier, on the other hand, no personal information is so provided.

This definition illustrates the broad scope of the GDPR. The cookie examples given above would be called personal information according to some interpretations of the GDPR, and most or many other recent privacy regulations as well. The GDPR is regarded by most as a broadening of privacy because the GDPR includes elements that do not themselves identify, but only in combination with other elements, or used as surrogates for a person in some circumstances. Such requirements are also present in other recent regulations, such as the U.S. Health Insurance Portability and Accountability Act (HIPAA) and the Financial Privacy and Safeguards Rules of the Gramm-Leach Bliley Act (GLBA).

The GDPR supports anonymization as an acceptable means of ensuring privacy, and uses a definition that seems to include the operation of cookies. But some people interpret GDPR to include cookies in the definition of personal information. One reason for this view relates to conceivable anonymity loopholes. In any case, cookies do usually require an opt-out choice, and in the GDPR, an opt-in choice, making the elimination of cookies potentially desirable for the e-commerce world.

Anonymity Loopholes

Although by itself or in combination, a cookie used as intended does not supply a named identification of a person, the cookie could be used to tie a person to an event, as shown in the following example scenarios.

In one example scenario, a law enforcement agency, such as the French Police Nationale, searches David's home with a warrant, finds and removes his computer. The law enforcement agency then accesses the Chrome browser instance through David's computer and extracts the Zappos cookie from the corresponding web browser instance. The agency now knows that this web browser instance is associated with David's computer, and, therefore, associated with David. Based on this acquired knowledge, the agency could then use another warrant to commandeer information from Zappos about David. For example, the agency could commandeer from Zappos one of David's credit card numbers, or the fact that David bought shoes from Zappos that were illegal in France. Thus, by taking possession of a web browser instance, a cookie found associated with the web browser can be used as part of a trail to other information about an individual linked to the web browser instance.

In another example scenario, a service provider, such as Zappos, selects one of the cookies of which the service provider has possession through the software implemented at a web server of the provider. The selected cookie may be a cookie from one of David's web browser instances. The service provider adds to the server software the ability to connect with web browser instances across the web. The server then polls each of these browser instances, asking if the browser instance has the selected cookie (e.g., the cookie from David's web browser instance). If the software finds one instance that does have the selected cookie, the web server may request from the web browser instance other information associated with the web browser instance, such as the media access control (MAC) address assigned by the manufacturer to the network interface card on the computer hosting the web browser instance and the like.

Other example scenarios may use a variety of laborious but sometimes successful ways to locate and identify David's computer from a web browser instance hosted on David's computer. If David's computer is found, information about David stored at the web server and associated with the cookie may be retrieved from the service provider software. On the other hand, the retrieved information about David may already be available at the service provider's web server, if David is a registered customer of the service provider (e.g., Zappos). If he is not a registered customer, the only information that may be learned by this method is that David connected with the service provider, and his activity through the service provider (e.g., looked at certain of the shoes).

In other scenarios, a communication that contains information about a web browser or the web server may be captured and interpreted as the communication travels across the web. Through the captured and interpreted communication, the source and recipient of the communication may be discovered, which would identify the web browser instance or a web server of the service provider. With the information of the identified web browser instance or web server, then the scenarios described above may be used to locate associated information. However, these scenarios would only be used if the communication did not have information more valuable than standard cookie information, which includes no personally identifying information and no financial information.

OVERVIEW OF EMBODIMENTS

As indicated in the above descriptions, a cookie itself is ordinarily an anonymous identifier for a browser, which reveals nothing about the web browser identity. The cookie only enables observations of one web browser's behaviors to be related to later observations of the same web browser's behaviors. Yet, there may be reasons to create a further layer of anonymity, so that a cookie associated with a web browser instance is protected from named identification.

An example embodiment ensures the identity of a cookie associated with a web browser instance is masked (anonymous or completely eliminated), while enabling collecting by legitimate interested parties historical and statistical information from the web browser about user interactions on the web. The embodiments provide various computer systems, methods, and program products that transform a cookie, while preserving the cookie's use in gathering information about the web browsing behavior of a user.

The computer systems, methods, and program products transform the cookie of a web browser in a manner that makes the cookie untraceable to a website that generated and placed the cookie in the web browser instance. The computer systems, methods, and program products also disconnect the information available at a website (web server of a service provider) about the web browser from the elements found in the web browser instance on a user's computing device. The computer systems, methods, and program products further make any cookie-related information in a communication useless for discovering data about the communicating parties. In this way, the computer systems, methods, and program products close the loopholes exemplified above, along with avoiding other related reasons for claiming that cookies are being used in a manner that could conceivably violate privacy laws.

Embodiments of the computer systems, methods, and program products can be applied to cookies and web browser instances, as well as to other applications that protect knowledge of identifiers applied to and embedded in effects, such as machines and individual electronic records. Depending on the circumstances, the embodiments can be applied together, separately, or in many combinations.

System for Anonymous eCommerce Behavior Tracking

Figure 2:
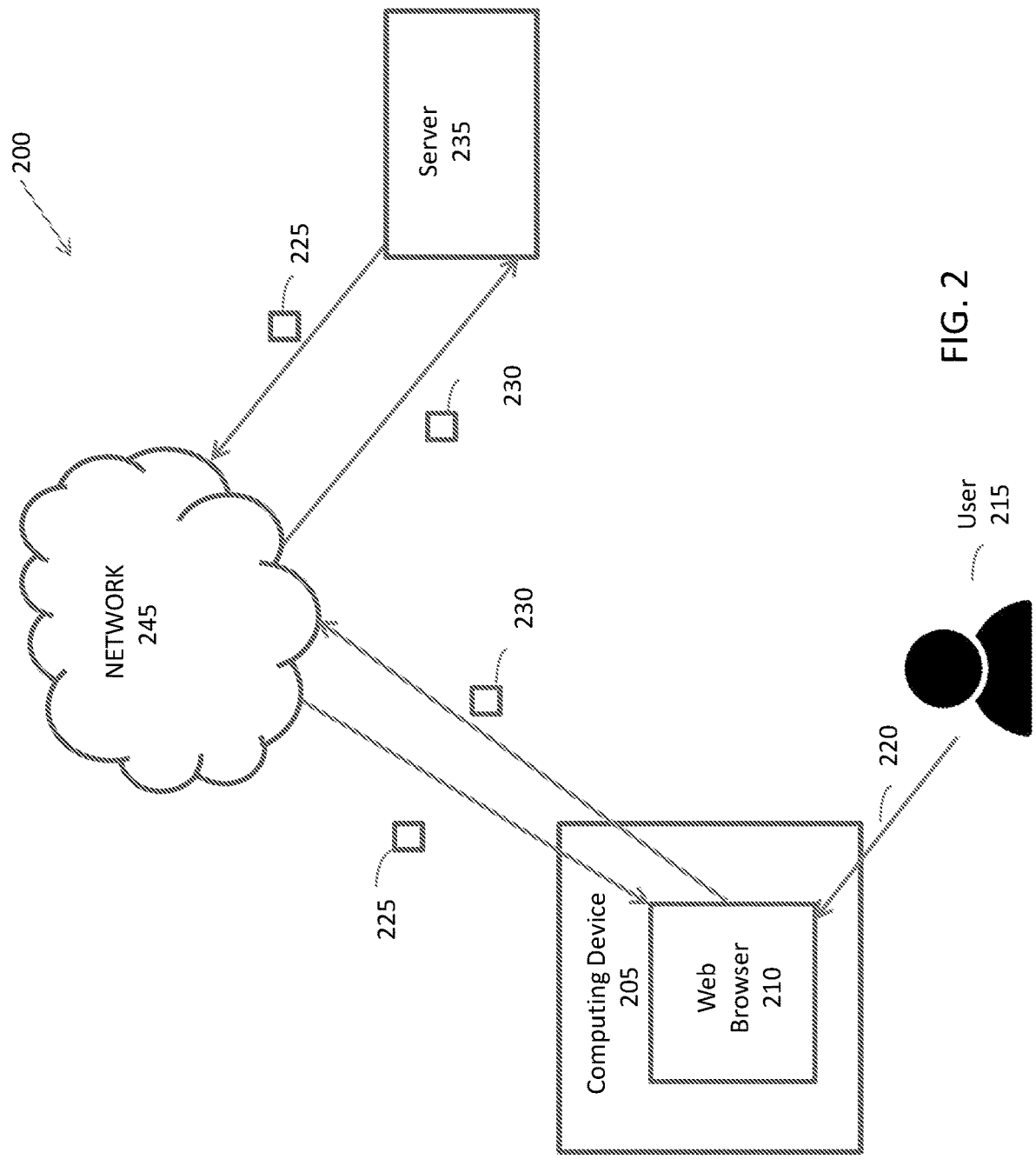
FIG. 2 is a block diagram of an example embodiment of an anonymous browser behavior tracking computer system.

FIG. 2 is a block diagram of an example embodiment of an anonymous browser behavior tracking computer system 200 that executes an example embodiment of a method disclosed herein. A user 215, via user input 220, invokes a web browser instance displayed via a web browser 210 executing on computing device 205 to accesses a website. The displayed website is for an online service provider. The website is accessed over network 245 (via connections 225 and 230) via a web server 235 configured in the environment of the online service provider. During the accessing of the website, the web server 235 customarily generates and stores a cookie on the computing device 205. The web server 235 uses the cookie to track the browsing activities of the user 215 via an instance of the web browser 210. The following embodiments transform the cookie or browsing information associated with the cookie to provide anonymous browser behavior tracking. That is, these embodiments prevent use of the cookie associated with the web browser instance to access web browsing information related to the web browser instance or related to any personally identifying information use of the cookie. These embodiments can be applied together, separately, or in combination.

Cookie One-Way Encryption

In first example embodiments, the system 200 executes a method that transforms a web browser cookie by the server 235 replacing the cookie with a new representation. The value of the cookie cannot be recovered from the new representation.

In some of the first example embodiments, when accessing a website at the web browser 210, the server 235 continues to generate and store (via connection 225) at the computing device 205 a cookie 225 associated with a web browser instance. The server 235 further encrypts the cookie 225 with a one-way hashing function, such as SHA-2 and a seed. In some embodiments, the server 235 salts the cookie before encrypting. For example, the server may concatenate or embed a string into the cookie 225 being encrypted. The server 235 then only stores the encrypted cookie, which now can serve only as a continuity token, not the original generated cookie 225, in memory coupled to the server 235. Each time a report from the web browser 210 on the computing device 205 delivers (via connection 230) the original generated cookie to the server 235, the server 235 encrypts the delivered cookie using the seed. The server 235 compares the encrypted delivered cookie against the stored encrypted cookie prior to recording a web browser event specified in the report.

In these first example embodiments, only the web browser 210 executing on the computing device 205 stores the original generated cookie, so the original generated cookie cannot be located in data stored at the server 235. Only the server 235 has access to the encryption key, so the encrypted cookie cannot be determined by extracting the original generated cookie from a web browser instance at the computing device 210. Thus, browser event records (associated with the encrypted cookie stored at the server 235) is untraceable from the web browser 210, and the computing device 205 executing the web browser 210 is untraceable through the server 235. In these first embodiments, it is only possible to determine, by examination of the web browser instance, that the web browser 210 had some connection with the server 235 at some time.

Cookie Encryption by the Browser

In other example embodiments of cookie encryption, the system 200 executes a method that conceals a cookie associated with the web browser instance of a website, thereby making recovery of the concealed cookie by a third-party impossible.

In the second example embodiments, the server 235 does not generate a customary web browser cookie. Instead, the system 200 executes a new process that is special to the otherwise cookie-producing server 235. In these second example embodiments, the system 200 includes an agent of the server 235, which places 225 on the computing device 205 (via connection 225) an application, program, or other executable file associated with each instance of the web browser 210. Each time a webpage is accessed through the web browser 210, the application, program, or other executable file executes the new process to generate an anonymous identifier for the respective web browser instance.

In some of the second example embodiments of the first class, the agent of the server 235, creates and places (via connection 225) a universal pixel on the computing device 205 associated with each instance the web browser 210. Each placed universal pixel is configured with a process (algorithm) that generates a unique token (anonymous identifier) for the web browser instance associated with a placed universal pixel. Each time a webpage is accessed through the web browser, the placed universal pixel communicates back to the respective web browser instance and, the communication includes the generated anonymous identifier of the web browser instance. A report from the web browser 210 on the computing device 205 delivering (via connection 230) a web browser event to the server 235 includes the anonymous identifier in a structure that disguises the role of the generated anonymous identifier. The server 235 uses the anonymous identifier, in place of the customary cookie, to record the web browser event at the server 235.

In this way, the web browser instance is not associated with a cookie, or any other such identifier that may be recovered by a third-party, as the anonymous identifier is regenerated each time the anonymous identifier is needed by a web browser instance. Further, the communication structure used to deliver the anonymous identifier (e.g., to the web browser 210 or server 235) further contributes to the anonymousness of the web browser identity by disguising the role of the generated anonymous identifier. With the regenerated anonymous identifier, recovery of the web browsing behavior of the user 215 is impossible to retrieve in either direction between the web browser 210 and the server 235. Further, the communication used to transmit (via connection 230) the anonymous identifier will not provide any usable information on the contained anonymous identifier, beyond the source and destination of the communication. Thus, privacy rules specific to cookies will not apply to the regenerated anonymous identifier.

Cookie Asymmetric Encryption

In some of these first class of embodiments, the system 200 executes a method that uses a private-public keypair method to encrypt the cookie prior to placing the cookie at the web browser 210 on the computing device 205. The system 200 thereby limits cookie access to public key holders. The private-public keypair is managed by a secure capsule, such as a Trusted Execution Environment (TEE) or Trusted Platform Module (TPM). The secure capsule is configured (resides) on a computing node at the server 235. The server 235 uses the secure capsule to generate the keypair, protect the private key, and release the public key to the server computing node. The server computing node generates the cookie and invokes the secure capsule to securely encrypt the cookie using the private key of the private-public keypair. The cookie can only be decrypted using the public key of the private-public keypair. The server 235 uses the generated (un-encrypted) cookie to anonymously identify event records stored for the web browser 210 at the server 235.

The server computing node places (via connection 225) the cookie in encrypted form at an instance of the web browser 210 on the computing device 205. By placing the cookie encrypted at the web browser 210, the encrypted cookie cannot be tied to the actual cookie used as the anonymous identifier of the browser event records held on the server 235. When a web browser event and associated encrypted cookie are collected and reported (via connection 230) to the server 235, the server computing node decrypts the cookie using the public key and updates the browser event records without identifying the cookie associated with the web browser event. In this way, only de-identified history and statistical records of web browser events can be found and inspected at the server 235, or delivered to third parties.

Browser Behavior Aggregation

In the second class of embodiments, the system 200 executes a method that uses a single continuity token stored on the server 235 to identify each set of individual browser instances that have the same event histories. In some of the third example embodiments, the single token is a browser aggregation identifier (BAI). In these embodiments, the server 235 keeps aggregate statistics on browser events by using a BAI to represent the set of individual browser instances that have experienced the same browser events. In this way, the BAI permits statistical data gathering on browsers, but eliminates the identification of information tied to individual web browsers associated with individual cookies.

In these embodiments, the server 235 associates each BAI with a list (sequence) of event types that apply to the individual cookies aggregated under that BAI. A given BAI represents all the browsers which have exhibited this sequence of event types. The server 235 creates such BAIs as the BAIs are needed for new browser events reported to the server. At least one behavior aggregation identifier (BAI) applies to each browser instance. The server need not know any individual identity for the instance, only the BAI (or BAIs) to which it belongs. When any browser instance with a given BAI-1 exhibits a new behavior, a new BAI-2 is assigned that is the sequence of the BAI-1 behaviors followed by the new behavior. If there already exists this sequence with a BAI-2 assigned to it, then the browser instance is now assigned to this new group. If such a sequence does not yet exist, then it is created and the browser instance is assigned to that group. In this way, browser instances are not assigned unique continuity tokens, but instead of token shared by all browser instances which have exhibited the same sequence of behaviors. Thus, the BAI is a continuity token not for a browser instance, but for an equivalence class of instances.

In some embodiments, the server 235 may assign the BAI to the browser instance in different ways, for example, a. inserting the BAI as a 'pseudo cookie' into the browser instance, so that unique cookies are not in the instances being tracked. For another example, b. using an embodiment of the first class to capture anonymous continuity tokens for each browser instance, and associating these captured tokens with the BAIs to which they belong. Embodiments of this type may be preferred.

In other embodiments, the server 235 may create separate aggregations based on different rules of 'same' and 'different' for the aggregations, rather than for the browsers. For example, one aggregator system might treat any two clicks to a landing page as the same event, while another might distinguish between which clickable item in the content was clicked. Finer grained embodiments are preferred.

In yet other embodiments, the server 235 may count aggregate amounts differently. For example, in one embodiment, a browser event that has contributed to a count for the BAI-1 may be removed from that count when the BAI signals that a new event has occurred, creating BAI-2, while another embodiment may count the browser event twice, as part of both BAIs, and a third embodiment might have two counts—both unique counts and multiple counts. Similarly, every winner of the Triple Crown is also a winner of the Kentucky Derby, and can be counted in the number of winners of each.

In some embodiments, the server 235 may use a separate and secure memory space for storing the links between individual browser instances, via encrypted cookies, and the BAIs to which those browser instances conform. The separate and secure storage memory space may be protected in any one of a variety of ways, for example, through one-way encryption, asymmetric keypairs, or blockchain, as discussed in reference to other embodiments.

As an experienced browser event is collected from an instance of the web browser 210 on the computing device 205 and reported (via connection 230) to the server 235, the server 235 examines the browser event and determines the linked BAI based either on the encrypted cookie associated with the browser instance, or on the new event collected in reference to the BAI, which is itself is stored on all the browser instances in the equivalence class. The server 235 then decides whether: (i) the linked BAI continues to apply to the instance associated with the collected browser event, (ii) a different existing BAI should be linked to the collected browser event, or (iii) a new BAI is required to be created and linked to the collected browser event. The BAIs may also be differentiated by other non-identifying attributes, such as by the e-commerce vendor concerned with a given browser event. The server 235 updates the aggregated statistics of the current linked BAI according to the collected browser event.

In these embodiments, access to the links and event types stored at the BAI storage space does not yield any information about the behaviors of individual web browser instances. As a result, it will be impossible to start with this information and learn which web browser instances are involved, or start with cookies on the web browsers and learn about the web browser's behavior. In these embodiments, a complete record of the history of equivalent browser events cookies is tracked as the events occur, so a beneficial side effect is that the total history need not be compiled separately after the occurrences (at high computational cost).

In a final third class of embodiments, cookie concealment with a continuity token and browser behavior aggregation with a browser aggregation identifier or other equivalence class continuity token may be combined and various methods of storing the tokens and their relationships more securely may be allowed.

Continuity Token Ledgering

In some combined example embodiments, the system 200 executes a method that uses a private ledger that securely identifies and stores each web browser event associated with a continuity token. The web browser events stored in the private leger associated with a continuity token comprise the story, or event history, of the web browser instance 210. The private ledger may be stored in memory communicatively coupled to the server 235. In these embodiments, a cookie is used at the web browser 210 on computing device 205 and the web browser event and associated cookie are collected and reported (via connection 230) to the server 235, where the cookie is encrypted as a continuity token before it is stored. The server 235 receives the collected web browser event and cookie, and identifies the private ledger that incorporates all the previous uses of that browser instance. The server 235 adds the collected new web browser event to the identified private ledger. The system 200 protects the private ledger with identification and authorization rights, so that only legitimate parties can access and read the ledger. For example, the cookie ledger may be protected using blockchain technology.

In an example embodiment, the private ledger replaces stories about sequences of browser behaviors with statistics about abstracted "story types." A story type being a sequence of behavior types common to all web browser instances which have performed that sequence. The example embodiment that replaces stories with story types may assign behavior aggregation identifies (BAIs) to each behavior and sequence of behaviors observed, independently from the browser instance that exhibited the behavior, and may associate statistics such as numbers and times and network contexts of occurrence with the BAIs. The information about the individual browser instance behavior is not collected by the pixel, or if collected, not retained. The information necessary to measure web marketing performance is derived instead from the pre-aggregated BAIs.

In these embodiments using a ledger, the possession of a cookie found either associated to web browser 210 on computing device 205, or on the server 235 where it will usually be encrypted, or in a communication between the computing device 205 and server 235 does not give access to the event history of the web browser 210. Such access is only achieved through the private ledger, secured in a protected chain or other secure structure. In these embodiments, a complete record of the history of a cookie is tracked as associated web browser events occur, so that a beneficial side effect is that the total history need not be compiled separately after the occurrences (at high computational cost). Further, verification techniques (such as blockchain verification techniques) used in creating a private event ledger give high assurance of the accuracy of the information contained in the private ledger. Using a non-reputable identity supplied voluntarily by the user 215 of the web browser 210, the private ledger can also be used as a non-reputable evidence of user transactions and agreements. Thus, the ledger can also supply e-commerce vendors with distributed leger capabilities as a service.

Further example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams may be implemented in software or hardware, firmware, a combination thereof, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein. Further, example embodiments and elements thereof may be combined in a manner not explicitly disclosed herein.

Below is a Glossary of terms. In general, industry standard terms, that is, special terms of art that should be familiar to those of ordinary skill in this art are not italicized. Terms below that are believed to be new, or used in context believed to new, are italicized.

Glossary of Terms

Browser: a software product used to find and access websites

Browser Instance: the instance of a browser resident on a computing device

Cookie: a small piece of data that a server sends to the user's web browser. The browser may store it and send it back with the next request to the same server. Typically, it's used to tell if two requests came from the same browser—keeping a user logged-in, for example. It remembers stateful information for the stateless HTTP protocol. Cookies are mainly used for three purposes: 1. Session management Logins, shopping carts, game scores, or anything else the server should remember; 2. Personalization User preferences, themes, and other settings; and 3. Tracking Recording and analyzing user behavior.

Identifier: any piece or collection of data that can be used to single out an individual of a given type.

Personally Identifying Information (PII): data describing a person that could potentially identify a specific individual. Any information that can be used to distinguish one person from another and can be used for de-anonymizing anonymous data can be considered PII, such as addresses, zip codes, sex, age, . . . .

Personalized Cookie: a cookie that contains personally identifying information. PII can be added to a cookie either by a user who is asked and supplies PII to a website, or by the website itself.

(tracking) Pixel: a small block of code on a webpage that allow websites to do things like read and place cookies. The pixel fires when the browser reads the page, or performs some other action on the page, signaling the website. The resulting connection can include information such as the person's IP address, the time the person viewed the pixel and the type of browser being used.

Encryptiendum: a string to be encrypted. (AKA 'plain text', but it need not be).

Encryptiens: the resulting encryption of the string. (AKA 'cypher text')

Encryption Function: a mapping from encrytiendum to encryptiens

Encryption Key: a string used in conjunction with an encryption function to produce encryptions Hash Function: a function that maps a string of arbitrary length to a string of fixed length. A hash function may be used as an encryption function Hash Seed: an encryption key used in conjunction with a hash function One-Way Hash: a hash function from which the original string cannot be recovered Encryption Salt: a string concatenated to or embedded in the string to be encrypted, in order to further obscure the encryptions.

Asymmetric Key Pair: a pair of encryption keys that are used together, one for encryption, called the public key, and the other for decryption, called the 'private key'.

Equivalence Class: a group of members of a set that share a common property or behavior, and will all be treated as equivalent for some purpose. For example, all the balls in a basket that are the same color, or all the crew on a submarine with the highest degree of skill in sonar operations, or all the web browser instances that have been used to purchase a given item.

Partition: a group of equivalence classes that divide a set so that each member of the set is in exactly one equivalence class on the set. For example, all the equivalence classes of submarine crew each with a given degree of sonar skills.

New Terms

Token: an instance of an arbitrary string of symbols or other object, used to represent something else, according to some convention. For example, a cookie may be used as a token that represents the relation between a browser instance and the website that placed the cookie on the browser instance.

Anonymous Identification: the action of determining what, if any, previously encountered object produced an event, without knowing anything else about the object except what events it has produced.

Anonymous Identifier: an identifier which, in itself, provides no identifying information about the object to which it applies, except that it applies to exactly one object. For example, a randomly generated, arbitrary account number.

Named Identification: an identifier which provides identifying information about the object to which it applies. For example, an account number in which is embedded the account opening date.

Continuity Token: a token designed so that it can only be used to determine whether a new event is caused by the same object that caused some previous event. In this invention, continuity tokens are designed to either represent an anonymous web browser instance or an equivalence class of browser instances that have evinced the same behaviors.

Browser Instance Event: a behavior of a browser instance that is signaled by or recorded by the instance. Most often, these events trigger a pixel.

(eCommerce) Story: a contiguous sequence of browser instance events evinced by a single browser instance Browser Instance Event Type: an equivalence class of browser instance events that are classified together according to shared characteristics.

Story Type: a contiguous sequence of browser instance event types.

Behavior Aggregation Identifier (BAI): a continuity token for an equivalence class story types. A BAI will apply to all browser instances that have executed the same story type.

Exhaustive Story Type Set: a set of story types such that each browser instance for which a story has been reported belongs to at least one class.

Exclusive Story Type Set: a set of story types such that each browser instance for which a story has been reported belongs to at most one class.

Story Type Partition: a Story Type set that is both exhaustive and exclusive. (and each browser instance belongs to exactly one story type).

Story Ledger: a storage location in which each story or each story type is paired with either a continuity token for a browser or a BAI.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A system for protecting user privacy, the system comprising:
   a computing device configured to execute a web browser instance;
   a web server configured to generate an aggregation identifier,
   the aggregation identifier being configured to control one or more aggregated statistics, the one or more aggregated statistics being related to a set of cookie tokens,
   the aggregation identifier having one or more event types, the one or more event types being associated with the set of cookie tokens,
   the web server further configured to computationally pair each cookie token of the set of cookie tokens with the aggregation identifier based on a corresponding web browser instance associated with the cookie token having produced the one or more event types, a cookie token of the set of cookie tokens being associated with the web browser instance,
   the web server further configured to preclude use of a cookie to access data relating to a user of the web browser instance by:
      identifying an event produced by the web browser instance; and
      responsive to the identifying, performing at least one of:
         (i) verifying that the aggregation identifier is computationally paired with the event;
         (ii) determining that a different aggregation identifier corresponds to the event and the web browser instance and computationally pairing the different aggregation identifier with the event; and
         (iii) generating a new aggregation identifier and computationally pairing the new aggregation identifier with the event.

2. The system of claim 1, further comprising a secure memory coupled to the web server, the secure memory configured to store computational pairings between the aggregation identifier and each cookie token of the set of cookie tokens.

3. The system of claim 2, wherein the secure memory is protected by at least one of one-way encryption, asymmetric keypairs, and blockchain keypairs.

4. The system of claim 1, wherein each of the set of cookie tokens is a cookie or an anonymized cookie token.

5. The system of claim 1, wherein the web server is further configured to preclude the use of the cookie to access the data relating to the user of the web browser instance by:
   using a key, transforming the cookie into an encrypted cookie;
   storing, at the web server, the encrypted cookie and the key;
   storing, at the computing device, the cookie; and
   responsive to receiving (i) the cookie and (ii) the event, the event being associated with the cookie:
      using the stored key, encrypting the received cookie; and
      validating the encrypted delivered cookie against the stored encrypted cookie prior to processing the received event.

6. The system of claim 1, wherein the web server is further configured to purge personally identifying information of the user from the cookie by generating a continuity token for use in lieu of the cookie.

7. The system of claim 6, wherein the web server is further configured to generate the continuity token based on a one-way hash.

8. The system of claim 7, wherein the one-way hash is configured to use the cookie as a seed string.

9. The system of claim 1, wherein the web server is further configured to preclude the use of the cookie to access the data relating to the user of the web browser instance by:
   configuring a module to generate an anonymous identifier for the web browser instance, the module being paired with the web browser instance;
   receiving a data structure, the data structure including (i) the event and (ii) the generated anonymous identifier, the data structure being configured to obfuscate a function of the generated anonymous identifier; and
   processing the received event using the generated anonymous identifier in lieu of the cookie.

10. The system of claim 9, wherein the module is a universal pixel.

11. The system of claim 1, wherein the web server is further configured to preclude the use of the cookie to access the data relating to the user of the web browser instance by:
   responsive to receiving the event, the event being associated with a continuity token:
      identifying a private event ledger associated with the continuity token; and
      storing, via the identified private event ledger, the received event.

12. The system of claim 11, wherein the continuity token is extracted from the cookie.

13. The system of claim 1, further comprising a computing node of the web server, the computing node including a secure capsule, and wherein the web server is further configured to preclude the use of the cookie to access the data relating to the user of the web browser instance by:
   via the secure capsule, generating a private key and a public key;
   generating the cookie, the cookie being configured to identify at least one event produced by the web browser instance;
   via the secure capsule, transforming the generated cookie into an encrypted cookie using the private key;
   computationally pairing the encrypted cookie with the web browser instance; and
   responsive to receiving (i) the event and (ii) the encrypted cookie:
      decrypting the received encrypted cookie; and
      incorporating the received event into the at least one event without identifying the generated cookie.

14. The system of claim 13, wherein the secure capsule is a Trusted Execution Environment (TEE) or a Trusted Platform Module (TPM).

15. A computer-implemented method for protecting user privacy, the method comprising:
generating an aggregation identifier,
the aggregation identifier being configured to control one or more aggregated statistics, the one or more aggregated statistics being related to a set of cookie tokens,
the aggregation identifier having one or more event types, the one or more event types being associated with the set of cookie tokens;
computationally pairing each cookie token of the set of cookie tokens with the aggregation identifier based on a corresponding web browser instance associated with the cookie token having produced the one or more event types, a cookie token of the set of cookie tokens being associated with a web browser instance executed by a computing device; and
precluding use of a cookie to access data relating to a user of the web browser instance by:
identifying an event produced by the web browser instance; and
responsive to the identifying, performing at least one of:
(i) verifying that the aggregation identifier is computationally paired with the event;
(ii) determining that a different aggregation identifier corresponds to the event and the web browser instance and computationally pairing the different aggregation identifier with the event; and
(iii) generating a new aggregation identifier and computationally pairing the new aggregation identifier with the event.

16. The computer-implemented method of claim 15, further comprising:
storing, in a secure memory, computational pairings between the aggregation identifier and each cookie token of the set of cookie tokens.

17. The computer-implemented method of claim 16, further comprising:
protecting the secure memory by at least one of one-way encryption, asymmetric keypairs, and blockchain keypairs.

18. A non-transitory computer program product for protecting user privacy, the non-transitory computer program product comprising a computer-readable medium with computer code instructions stored thereon, the computer code instructions being configured, when executed by a processor, to cause the processor to:
generate an aggregation identifier,
the aggregation identifier being configured to control one or more aggregated statistics, the one or more aggregated statistics being related to a set of cookie tokens,
the aggregation identifier having one or more event types, the one or more event types being associated with the set of cookie tokens;
computationally pair each cookie token of the set of cookie tokens with the aggregation identifier based on a corresponding web browser instance associated with the cookie token having produced the one or more event types, a cookie token of the set of cookie tokens being associated with a web browser instance executed by a computing device; and
preclude use of a cookie to access data relating to a user of the web browser instance by:
identifying an event produced by the web browser instance; and
responsive to the identifying, performing at least one of:
(i) verifying that the aggregation identifier is computationally paired with the event;
(ii) determining that a different aggregation identifier corresponds to the event and the web browser instance and computationally pairing the different aggregation identifier with the event; and
(iii) generating a new aggregation identifier and computationally pairing the new aggregation identifier with the event.

19. The non-transitory computer program product of claim 18, wherein the computer code instructions are further configured to cause the processor to:
store, in a secure memory, computational pairings between the aggregation identifier and each cookie token of the set of cookie tokens.

20. The non-transitory computer program product of claim 19, wherein the computer code instructions are further configured to cause the processor to:
protect the secure memory by at least one of one-way encryption, asymmetric keypairs, and blockchain keypairs.

* * * * *